US009142242B1

(12) United States Patent
Peters et al.

(10) Patent No.: US 9,142,242 B1
(45) Date of Patent: Sep. 22, 2015

(54) REMOTELY CONTROLLING APPLIANCES BASED ON LIGHTING PATTERNS

(75) Inventors: Gavin Peters, Cambridge, MA (US); James Y. Knight, Belmont, MA (US); David Arthur Rochberg, Cambridge, MA (US)

(73) Assignee: Google Inc., Mountain View, CA (US)

( * ) Notice: Subject to any disclaimer, the term of this patent is extended or adjusted under 35 U.S.C. 154(b) by 341 days.

(21) Appl. No.: 13/527,609

(22) Filed: Jun. 20, 2012

(51) Int. Cl.
*H04N 5/232* (2006.01)
*G11B 7/00* (2006.01)

(52) U.S. Cl.
CPC .............. *G11B 7/00* (2013.01); *H04N 5/23203* (2013.01)

(58) Field of Classification Search
CPC .................................................. H04N 5/23203
USPC ......................................... 348/211.8, 211.99
See application file for complete search history.

(56) References Cited

U.S. PATENT DOCUMENTS

| 7,232,067 B1 | 6/2007 | Bromer |
| 7,374,106 B1 | 5/2008 | Bromer |
| 7,884,734 B2 | 2/2011 | Izadi et al. |
| 2003/0128187 A1* | 7/2003 | Strubbe .......................... 345/157 |
| 2007/0201769 A1* | 8/2007 | Node et al. ..................... 382/309 |
| 2010/0317332 A1* | 12/2010 | Bathiche et al. .............. 455/418 |

OTHER PUBLICATIONS

Sebastian, A., "TeleTouch: Turn your smartphone into a truly universal remote control", Oct. 5, 2011, Available from http://www.extremetech.com/computing/98601-teletouch-turn-your-smartphone-into-a-truly-universal-remotecontrol.
"Facilitating printer location and transfer of documents from Smartphone to printers via augmented reality", IP.com No. IPCOM000200838D, disclosed anonymously, Oct. 27, 2010, Available at http://priorartdatabase.com/IPCOM/000200838.

* cited by examiner

*Primary Examiner* — Usman Khan
(74) *Attorney, Agent, or Firm* — Morris & Kamlay LLP

(57) ABSTRACT

Disclosed is a method and apparatus for attaining control a device in a home automation network. The disclosed method may include establishing, by a processor, communication with an appliance controller. A list of appliances controlled by the appliance controller may be requested. The processor may receive the list of appliances from the appliance controller. A control request may be sent to the appliance controller. A series of images may be collected of the lighting patterns generated by a first appliance in the list of appliances in the field of view of the camera. A specific light pattern collected from the series of images may be correlated with the first appliance.

21 Claims, 3 Drawing Sheets

100

REMOTELY CONTROLLING APPLIANCES BASED ON LIGHTING PATTERNS

BACKGROUND

Home automation networks include devices or appliances that are controllable by network gateway control devices and the network controller in the network. The gateway control devices or network controller may have a user interface that allows users to select devices and set control parameters for them. However, the user has to know the location and orientation of the devices to be controlled before interacting with the user interface. With a number of devices in a residence, a user may have difficulty recalling all of the respective locations and orientations of each device for which the user wishes to adjust the control parameter.

BRIEF SUMMARY

According to an embodiment of the disclosed subject matter, a method is described that may include establishing, by a processor, a communication channel with an appliance controller of a premises. A list of appliances controlled by the appliance controller may be requested. The processor may receive the list of appliances from the appliance controller. A control request may be sent to the appliance controller. The request may include a code for the controller to generate specific lighting patterns for each of the listed appliances. A video camera coupled to the processor may collect a series of images of the lighting patterns of appliances in the field of view of the camera. The specific light pattern may be identified as being emitted by an appliance from the collected series of images. The specific light pattern may be correlated to a specific appliance from the list of appliances. An indication may be presented in a user interface for each of the specific appliances that the specific appliance was successfully correlated in response to the correlation of the light pattern to a specific appliance in the list of appliances. Upon selection of a presented indication for the specific appliance, a list of control parameters for controlling the operation of the selected appliance may be presented in the user interface. The processor may establish communication with an appliance controller. A list of appliances controlled by the appliance controller may be requested. The list of appliances from the appliance controller may be received by the processor. A control request may be sent to the appliance controller. A series of images of the lighting patterns of a first appliance in the list of appliances in the field of view of the camera may be collected. A specific light pattern may be associated with the first appliance from the collected series of images. The specific light pattern may be correlated to the first appliance.

According to an embodiment of the disclosed subject matter, a method is disclosed that may include establishing, by a processor, communication with an appliance controller. A list of appliances controlled by the appliance controller may be requested. The processor may receive the list of appliances from the appliance controller. A control request may be sent to the appliance controller. A series of images may be collected of the lighting patterns generated by a first appliance in the list of appliances in the field of view of the camera. A specific light pattern collected from the series of images may be correlated with the first appliance.

According to an embodiment of the disclosed subject matter, an apparatus is disclosed that may include a camera, a transceiver, and a processor. The camera may be used to obtain a series of images. The transceiver may be used for sending and receiving signals to a home automation network. The processor may be configured to perform functions such as establishing communication with an appliance controller. The processor may also request list of appliances controlled by the appliance controller. The processor may receive the list of appliances from the appliance controller. A control request may be sent by the configured processor to the appliance controller. The camera may collect a series of images of the lighting patterns generated by a first appliance in the list of appliances in the field of view of the camera. A specific light pattern collected from the series of images may be correlated by the processor with the first appliance.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

It would be advantageous to provide a system and method for identifying devices and appliances and/or the devices' or appliances' location in a premises in order that the devices may be identified for immediate control of the devices in a home control network. To do so, embodiments of the disclosed subject matter provide techniques for illuminating or otherwise activating various portions, such as a speaker, of devices available for a user to control in a particular detection pattern. A detection pattern may be an illumination pattern, a sound pattern, or a combination of both. Of course, other properties of the controllable devices may be identified. For example, a detection pattern of sounds or other distinguishing feature, such as a device brand logo or a series of edges, may be used to identify the respective devices. Another device, such as a smartphone, may use a still or video camera to capture images or video of the illumination or activation and thereby identify one or more devices that are available to be controlled by the user. For example, a user may use a smartphone to request a list of lighting devices in a room. The user may then instruct one of the lighting or sound generating mechanisms to be activated, such as by illuminating the lights in a particular pattern, or generating a particular pattern of sound. The sounds may be tones, speech, musical melodies, high or low frequency sounds, or the like. Of course, the generated sounds would have to be within the detectable range of the microphone. Upon identifying the pattern using a microphone, a still or video camera, the smartphone may then provide information and control options to the user. Alternatively, the camera may capture the image of a logo on the device or some other distinguishing feature of the device.

There may be a number of devices in a room that are controlled by control devices in a home automation network. It may be difficult for a user to identify each device in the room that may be controlled. In addition, different control parameters may cause changes in the ambience of the room depending on the changes made to the control parameters. Therefore, it would be beneficial if a user may be in the room and be able to quickly ascertain which devices are controllable, and have device identifiers so the user can make the appropriate changes.

Figure 1:
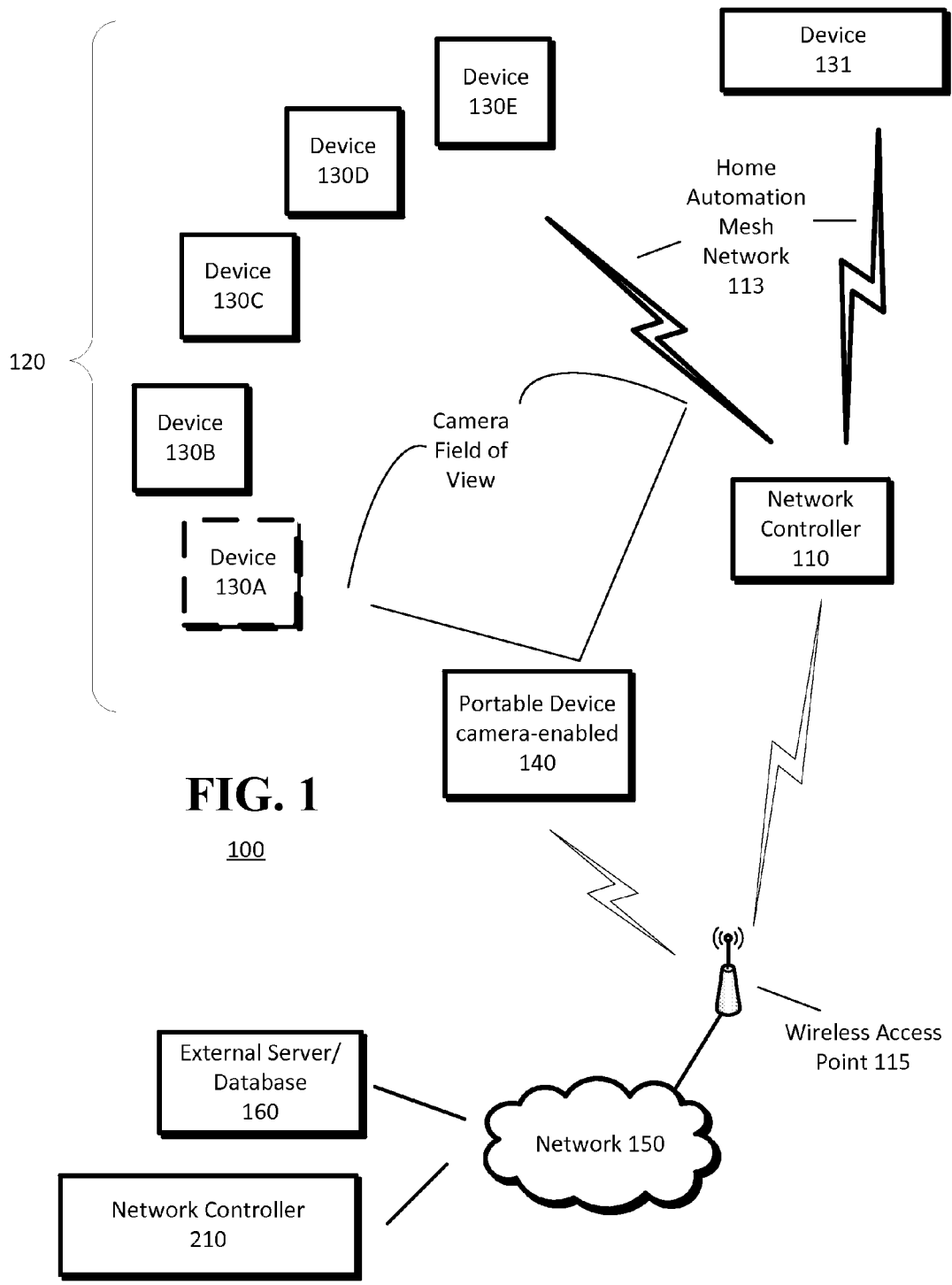
FIG. 1 shows a network configuration according to an embodiment of the disclosed subject matter.

FIG. 1 shows a system configuration according to an embodiment of the presently disclosed subject matter. The system 100 may include a home automation network 120, a wireless access point 115, a portable device having a camera 140, a microphone (not shown), an external network 150 and an external data storage/database 160. The home automation network 120 may also have access to the external network 150, such as the Internet, such as via the wireless access point 115. An external server/database 160 may be accessed through external network 150. Also, a network controller 210 of a different home automation network implemented in, for example, a vacation home or a business, may be accessible by the network controller 110 through the network. The wireless access point 115 may be a Wi-Fi access point, or similar type of communication network. The camera-enabled, portable device 140 may also have access to the wireless access point 115, and may be configured to communicate with the home automation network 120. For example, the portable device 140 may be a smartphone that includes, for example, an input device, a display device such as a touchscreen, a processor, a camera, a microphone, a memory and a transceiver. The camera within the portable device 140 may be a still camera capable of collecting a number of images in a short duration (e.g., 2-3 frames per second), a video camera, or the like. Alternatively, portable device 140 may have an ambient light sensor and/or a proximity sensor as well as a camera. The ambient light sensor or proximity sensor may be considered as a "one-pixel camera" that may be used to collect the changes in brightness of a light. The ambient light and proximity sensors may have less intervening hardware than actual focal-plane-array cameras, which may reduce the system complexity and/or latency. A computer application may execute on the portable device 140 that is configured to receive inputs and communicate with the home automation network. Another computer application may execute on the portable device 140 that is capable of recognizing patterns in the data provided by an input device, such as a camera or a microphone.

The home automation network 120 may include a network controller 110, and devices 130A-E and 131. The network controller 110 and electrical devices 130A-E, 131 may communicate with one another through a home automation mesh network 113. Other components may also be included in the home automation network 120 such as intermediate control points and additional devices, but for the ease of description only a few devices 130A-E, 131 and a single control device 110 are shown. The home automation mesh network 113 may be configured to operate according to a network protocol, such as X10, Zigbee, Bluetooth, Wi-Fi or any other suitable network protocol. Although the home automation mesh network 113 is referred to as a "mesh network," other network topologies, such as a mobile ad hoc network, may also be used. The home automation mesh network 113 may also be configured to communicate with devices, systems and networks external to the home automation network by accessing the wireless access point. As a result, the portable device 140 may communicate with the home automation network 120 and individual devices, such as devices 130A-E and 131, within the network 120 through an external network, such as a cellular network, via the wireless access point 115. The portable device 140 may provide control instructions through the external network to the devices 130A-E and 131. The network 120 may also be configured to be directly accessible from an external network such as a cellular network. The network controller 110 and the individual devices 130A-E and 131 may be configured to communicate with the external network. The portable device 140 may able to transmit control signals directly the network controller 110 or the individual devices 130A-E or 131.

The devices 130A-E may be any type of device that is part of the home automation network 120. For example, devices 130A-E may be light fixtures or "intelligent" light bulbs that are controlled by the network controller 110, while device 131 may be a microwave, television, audio system or other device. The devices 130A-E and 131 are generally referred to herein as "devices," it will be understood that they may be appliances, such as televisions, picture frames, refrigerators, microwaves, audio systems and speakers, computers, computer peripheral devices, garage door openers, fireplaces and the like, or any other component that is operable as described herein. The terms "device" and "appliance" may be used interchangeably. Alternatively or in addition, the devices 130A-E and 131 may be control devices, such as wall switches or table top control devices that have some illuminating indicator, such as LED status lights or the like. The devices 130A-E and 131 may include microprocessors and transceivers, and may be capable of processing, sending and receiving signals from other devices 130A-E, 131 and the network controller 110. Although shown grouped together, the devices 130A-E may be separated from one another within a premises. For example, device 130A may be in one room and devices 130B-E may be in an adjacent room or outdoors. In addition, the devices 130A-E may or may not share common control parameters, and may or may not respond to the same control device, such as a light switch.

Figure 2:
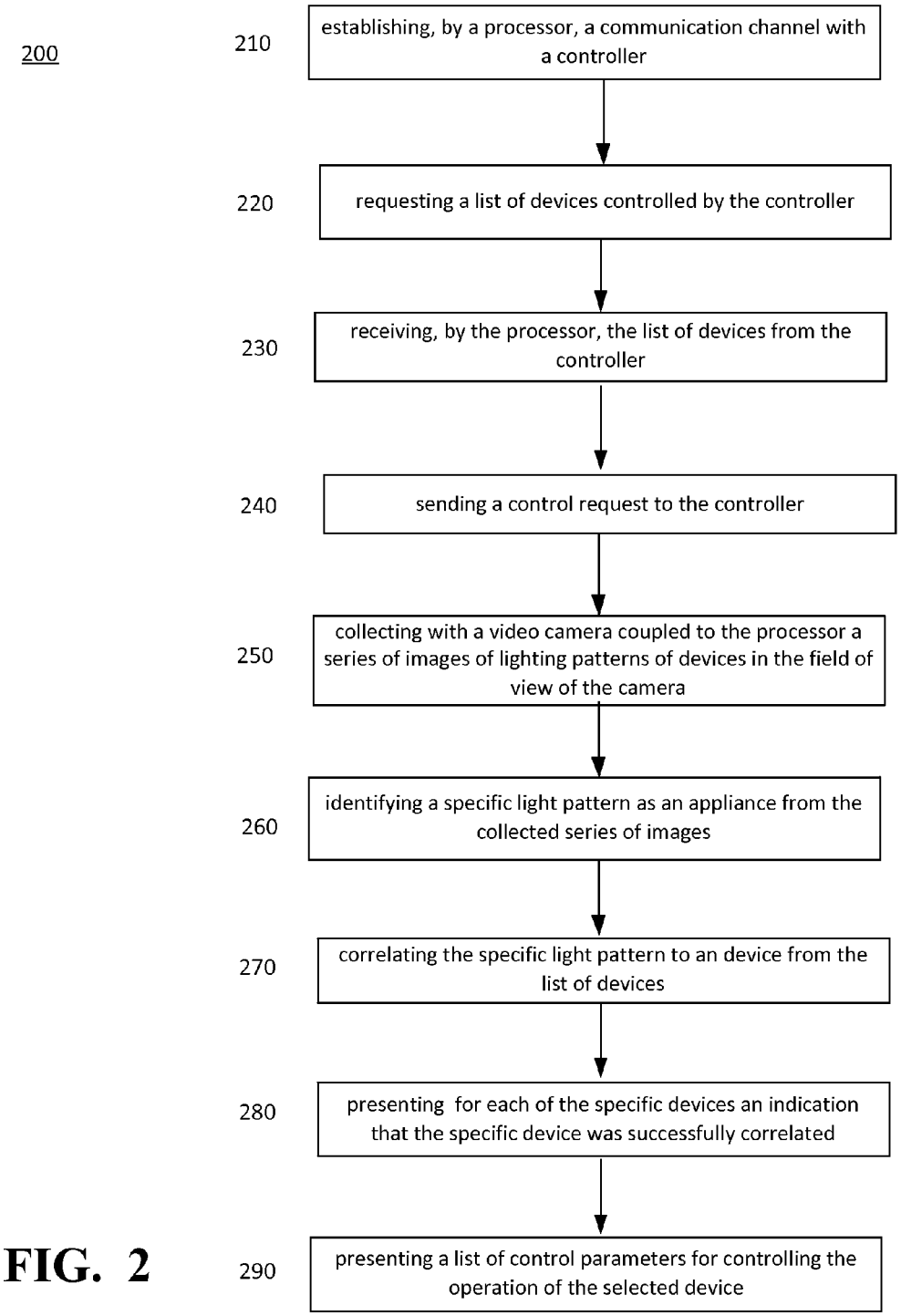
FIG. 2 shows a process according to an embodiment of the disclosed subject matter.

The computer application executing on the portable device 140 may be configured to access the home automation network 120 to retrieve data and interact with control devices within the network 120. FIG. 2 shows a process according to an embodiment of the disclosed subject matter. The process 200 may allow the devices within a home automation network to be controlled. A computer application executing on a portable device, such as portable device 140, may respond to an input selecting a home automation network to join. For example, the computer application may identify any home automation networks associated with a wireless network, such as through a wireless access point 115. In response to the input, a processor within the portable device may establish a communication channel with a controller in the home automation network (210). The processor may generate a request for a list of devices controlled by the controller (220), and send the request to the controller. The controller in response to the request may send a list of the devices that are commissioned in the home automation network to the portable device (230). The portable device may receive the list of commissioned devices. A graphical user interface within the portable device may present the list of commissioned devices to a user. The user may input a command that causes a camera in the portable device to actuate in preparation for collecting images. Alternatively, a microphone on the portable device may be actuated in preparation for collecting sounds. The actuation of the camera or microphone may cause, for example, a control request to be generated. Alternatively, the generation of the control request may cause the camera (or microphone, or both) to actuate and begin generating image data or recording sound. The control request may be sent from the smartphone to the controller (240). The control request may include identifiers of devices that may be controlled by command instructions input into the smartphone. The command instructions may include commands to control devices, such as wall switches or gateway devices that perform control functions, such as turning devices on and off. The command instructions may also be directed to specific devices instructing the devices to perform certain illumination functions, such as dim certain lights; instruct lights in a refrigerator, oven, microwave oven and the like to turn on/off (or flicker lights) in respective lighting patterns. Alternatively, the command instructions may direct specific devices to generate particular sounds or both sounds and images. As the devices are outputting the commanded light patterns, the camera in the smartphone may be used to collect a series of images of the respective lighting patterns output from each device (250). The specific light pattern for each of the respective devices may vary from frame to frame of the collected images. For example, a specific light bulb in one frame may be off or dim, while in the next two frames the specific light bulb is on and very bright. Each lighting fixture, light bulb, appliance or other device may be instructed to output different lighting patterns. Alternatively, as the devices are outputting the commanded sound, or sound and light patterns, the microphone in the smartphone may be used to collect the series of sounds of the respective sound patterns output from each device.

The series of images of the specific lighting patterns collected by the camera may be stored in a memory on the portable device, and may be retrieved by the processor. The collected images may be analyzed and processed by an image processing computer application and/or sound pattern recognition algorithm executing on the portable device. The processor using the image processing application may identify a specific light pattern from the collected images as one of the light patterns that was included in the outputted command instructions using, for example, an image processing program on the smartphone, or by forwarding the collected images to an external server that will process the series of images to identify the respective devices (260). Once identified, the specific light pattern may be correlated to a respective device from the collected series of images and in the field of view of the camera (270). Alternatively, the sound pattern may be correlated to a respective device from the collected series of sounds. As the devices are correlated by the processor, an indication may be presented on a graphical user interface indicating the successful correlation of the device with the light pattern (280). Upon completion of the correlation of all devices that are being correlated, a user may select the indication. As a result of the selection of the indication, a list of control parameters may be presented on the graphical user interface for controlling the operation of the selected devices (290). Alternatively, the list of control parameters may be presented on the graphical user interface after correlation of all devices in the camera view has been completed. In response to a selection of a control parameter from the list of control parameters, a control command may be generated and output to the selected devices.

The lighting pattern may have different configurations and durations. The lighting pattern may include different flickering patterns (e.g., 3 short flashes, then 3 long flashes), different brightness levels, different combinations of lights in multi-light appliances may be illuminated, or any combination of these may be used to form an identifiable lighting pattern. Other combinations or flickering may also be done. For example, light emitting diodes (LEDs) can flash at megahertz rates, such that the flashing of the lights may be imperceptible to a person. However, a portable device's video camera may collect images at a frame rate of 60 Hz, 30 Hz or lower. As a result, in a house with sixty light bulbs, for example, it may take eight flashes to identify the respective bulbs, which may take up to ¼-½ second. However, a satisfactory identification of the respective bulbs may be obtained by sampling a subset of the pixel data (or even a reduced number of image frames), instead of sampling all of the pixels. The number of pixels that may need to be sampled may depend on the number of light bulbs. For example, a limited number of light bulbs needing to be identified may require the sampling 10-100 pixels of the 6 million pixels of the camera. This may expedite the process from approximately a half second of flickering lights to taking less than 1-50 ms. The camera may be driven to capture images at a higher frame rate than required for traditional image capture. For example, the camera may be driven to a frame rate such as 60 Hz or greater. Limiting the amount of time needed to cause the lights to flicker provides a better user experience. Due to the brightness of the light sources, the camera can collect images of satisfactory quality even using the short exposures required to sustain a high frame rate.

The sound patterns generated by a respective device may be tones, musical melodies, machine-generated speech, high or low frequency sounds, or any sound that is detectable by the microphone. The generated sound patterns may or may not be perceptible by a human.

A user may set the control parameters for the respective device through inputs to the graphical user interface presented on the smartphone. In a specific example described with reference to FIGS. 1 and 2, a user may launch a computer application on a camera-enabled smartphone 140. The portable device 140 may send signals to the network controller 110 of the home automation network 120 via the wireless access point 115. The network controller 110 may receive the sent signals, and, after a verification process, a communication channel may be established between the portable device 140 and the network controller 110. The network controller 110 may forward a list, or other similar data structure, of devices 130A-E and 131 that are commissioned in the network 120 to the portable device 140. The list may include identifying information that uniquely identifies the devices 130A-E and 131, the device type, the general location of the device (e.g., kitchen, living room, patio, reception area, copy room, etc.), the number of illuminating elements within the respective device, whether the device is a control device (such as a light switch) and the devices that it controls, and the like. Additional signals may be exchanged between the portable device 140 and the network controller 110, such as via the wireless access point 115. For example, signals verifying the permissions of the portable device and other data related to the network 120 and portable device 140 may be contained in the list. Once the data is received, the portable device 140 may cause the camera on the portable device to be actuated, a control request may be generated, and the control request may be sent to the network controller 140. The control request may include a subset of devices from the list of devices provided by the network controller 110, and may include illumination instructions for the devices included in the control request. The illumination instructions may include commands related to any lighting elements (e.g., LEDs in a faceplate of a microwave, light inside the microwave, light bulb in a fixture, or an "intelligent" light bulb) in the respective device. The illumination instructions may include signals commanding the lighting elements to illuminate in a particular pattern. For example, devices 130A-E may be intelligent bulbs in a kitchen area of a premises. The portable device 140 may also be in the kitchen area, and the devices 130A-E may begin to output a lighting pattern according to the illumination command. The camera on the portable device 140 may collect images of the outputted lighting patterns. For example, the outputted lighting pattern may last for a short duration, such as 5-10 seconds, or may be repetitious lasting for a short duration. The portable device 140 may process the images and may identify each of the specific light patterns as a device. The collected images may be correlated to a specific device, such as device 130A based on the illumination commands to the respective devices. Through a user interface, control settings for the respective device, such as device 130A, can be set by a user. Continuing the example, the user can set a light bulb, such as device 130A, to dim by inputting a command into the user interface. The command may be sent to the network controller 110. The network controller 110 may store the command, and forward the command to the respective device. Similar image processing and setting of control parameters may be performed for other devices, and may also be forwarded to the network controller 115 for implementation.

Figure 3:
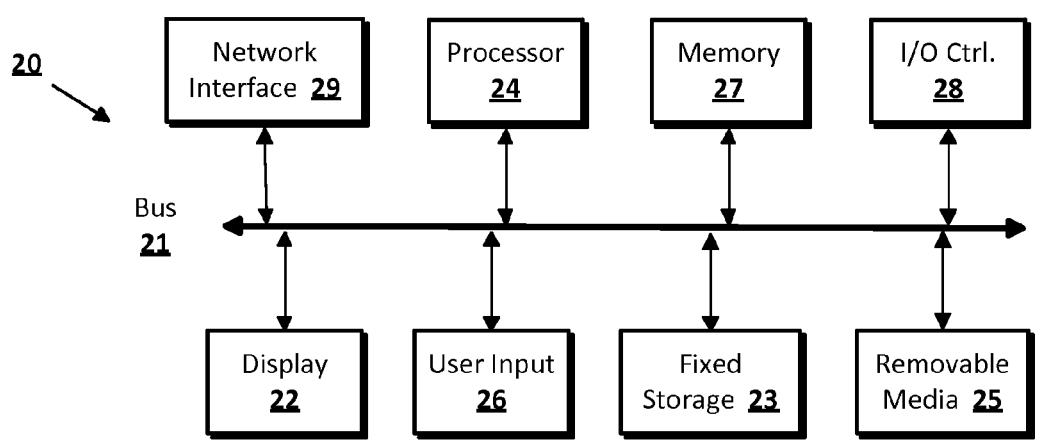
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. For example, the computer 20 may be implemented as a smartphone, tablet computer, netbook or laptop. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a camera, a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   establishing, by a processor, a communication channel with an appliance controller of a premises;
   requesting a list of appliances controlled by the appliance controller;
   receiving, by the processor, the list of appliances from the appliance controller;
   sending a control request to the appliance controller, wherein the request includes a code for the controller to generate specific lighting patterns for each of the listed appliances;
   collecting, with a video camera coupled to the processor, a series of images of the lighting patterns of appliances in a field of view of the camera in communication with the processor;
   sampling a portion of each image of the series of images to identify a specific light pattern from the collected series of images as being emitted by an appliance, the portion comprising no more than a number of pixels selected based on a total number of appliances of the list of appliances;
   correlating the specific light pattern to a specific appliance from the list of appliances; in response to the correlation of the light pattern to a specific appliance in the list of appliances, presenting an indication in a user interface for each of the specific appliances that the specific appliance was successfully correlated;
   upon selection of a presented indication for the specific appliance, presenting in the user interface a list of control parameters for controlling the operation of the selected appliance.

2. A method, comprising:
   establishing, by a processor, communication with an appliance controller; requesting a list of appliances controlled by the appliance controller;
   receiving, by the processor, the list of appliances from the appliance controller;
   sending a control request to the appliance controller;
   collecting a series of images of lighting patterns of a first appliance in the list of appliances in a field of view of a camera in communication with the processor,
   sampling a portion of each image of the series of images to identify a specific light pattern from the collected series of images as being emitted by an appliance, the portion comprising no more than a number of pixels selected based on a total number of appliances of the list of appliances; and
   correlating the specific light pattern to the first appliance.

3. The method of claim 2, further comprising:
   in response to the correlation of the light pattern to a specific appliance in the list of appliances, presenting an indication in a user interface for each of the specific appliances that the specific appliance was successfully correlated; and
   upon selection of a presented indication for the specific appliance, presenting in the user interface a list of control parameters for controlling the operation of the selected appliance.

4. The method of claim 3, further comprising: transmitting a control parameter to the controller.

5. The method of claim 2, wherein the control request includes a code for the controller to generate specific lighting patterns for each of the listed appliances.

6. The method of claim 2, wherein the list of appliances includes appliances that have lighting elements, and a unique lighting pattern assigned to each appliance that uniquely identifies the appliance.

7. The method of claim 2, wherein the specific lighting patterns include flickering lights, dimming lights, or combinations of both.

8. The method of claim 2, wherein the identifying further comprising:
   recognizing, by the processor, in the collected series of images an unique lighting pattern of flickering lights, dimming lights, or both;
   matching the recognized pattern to a unique lighting pattern assigned to the specific appliance.

9. The method of claim 2, wherein the control request includes commands indicating a unique lighting pattern, and the unique lighting pattern includes multiple lights that flicker or dim in unison.

10. The method of claim 2, wherein the control request includes commands indicating a unique lighting pattern, and the unique lighting pattern includes multiple lights that flicker and dim individually to form the unique lighting pattern.

11. The method of claim 2, wherein the series of images are collected with a video camera coupled to the processor.

12. The method of claim 2, wherein the appliance is at least one of a light bulb, a lighting fixture, a refrigerator, a freezer, an oven, a range, a coffee maker, a digital video recorder, a television, a garage door opener, or an audio system.

13. The method of claim 2, further comprising:
   receiving, by the processor, an input command to control the first appliance.

14. The method of claim 13, further comprising:
   generating, in response to the input command, a control command to change a state of the first appliance from a first state to a second state.

15. The method of claim 2, wherein the control request comprises an instruction for the first appliance to generate a lighting pattern at a rate above 60 Hz.

16. An apparatus, comprising:
   a camera;
   a transceiver for sending and receiving signals to a home automation network; and a processor configured to:
      establish communication with an appliance controller in the home automation network via the transceiver;
      request from the appliance controller in the home automation network a list of appliances controlled by an appliance controller;
      receive the list of appliances from the appliance controller;
      send a control request to the appliance controller;
      actuate the camera;
      collect a series of images of lighting patterns generated in response to the control request of a first appliance in the list of appliances in the field of view of the camera;
      sample a portion of each image of the series of images to identify a specific light pattern from the collected series of images as being emitted by an appliance, the portion comprising no more than a number of pixels selected based on a total number of appliances of the list of appliances; and
      correlate the specific light pattern to the first appliance.

17. The apparatus of claim 16, wherein the processor is further configured to:
   generate a control request, wherein the control request includes illumination commands for illuminating lights on the first appliance.

18. The apparatus of claim 17, wherein the illumination command includes commands for illuminating the lights on the first appliance in a specific light pattern unique to the first appliance.

19. The apparatus of claim 16, wherein the processor is further configured to drive the camera at a higher frame rate than required for traditional image capture.

20. The apparatus of claim 16, wherein the processor is configured to identify a specific light pattern by:
  recognizing in the collected series of images a unique lighting pattern of flickering lights, dimming lights, or both; and
  matching the recognized pattern to a unique lighting pattern assigned to the specific appliance.

21. The apparatus of claim 16, the list of appliances includes appliances that have lighting elements, and a unique lighting pattern assigned to each appliance that uniquely identifies the appliance.

* * * * *